United States Patent [19]
Lee

[11] Patent Number: 5,905,549
[45] Date of Patent: *May 18, 1999

[54] REDUNDANT CONDUCTOR STRUCTURE FOR AN LCD AND METHOD FOR FORMATION THEREOF

[75] Inventor: Jae Kyun Lee, Anyang-Shi, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/665,539

[22] Filed: Jun. 18, 1996

[30] Foreign Application Priority Data

Dec. 30, 1995 [KR] Rep. of Korea .................. 95-69080

[51] Int. Cl.$^6$ .................. G02F 1/136; G02F 1/1343; G02F 1/13
[52] U.S. Cl. .................. 349/42; 139/147; 139/187; 139/139
[58] Field of Search .................. 349/42, 147, 187, 349/139

[56] References Cited

U.S. PATENT DOCUMENTS

| | | | |
|---|---|---|---|
| 4,781,438 | 11/1988 | Noguchi | 349/42 |
| 4,938,567 | 7/1990 | Chartier | 349/149 |
| 5,148,301 | 9/1992 | Sawatsubashi et al. | 349/42 |
| 5,334,860 | 8/1994 | Naito | 349/147 |
| 5,559,345 | 9/1996 | Kim | 349/42 |

FOREIGN PATENT DOCUMENTS

2-20831  1/1990  Japan .

*Primary Examiner*—William L. Sikes
*Assistant Examiner*—Toan Ton

[57] ABSTRACT

A redundant electricity-conducting structure, and a method for making it, for use in a liquid crystal display ("LCD"). The LCD has a first layer and a second layer covering a portion of the first layer such that an edge is formed where the second layer starts. The redundant structure includes: a first conductor partially covering each of an area over the first layer and the second layer such that the first conductor must undergo a large change in surface direction where the conductor follows the edge contour of the second layer; and a redundant second conductor connected to and partially covering the first conductor at least in an area extending outside of an area under which is located the large change in surface direction. An example of the redundant electricity-conducting structure is where the first layer is a substrate, the second layer is a gate line, the first conductor is a data lien oriented perpendicularly to the gate line, the structure includes an insulating layer between the data line and the gate line, and the second conductor at least covers an area on the data line adjacent to and outside of intersection region of the data line with the gate line. Another example is where the first layer is an insulating layer, the first conductor is either a source or drain electrode for a transistor, and the second layer is a semiconductor layer connecting the source electrode to a drain electrode.

31 Claims, 5 Drawing Sheets

REDUNDANT CONDUCTOR STRUCTURE FOR AN LCD AND METHOD FOR FORMATION THEREOF

BACKGROUND OF THE INVENTION

1. Field of the Invention

The present invention relates to an improved liquid crystal display (LCD) device and an improved method of forming the array of conductors in an LCD device and, more particularly, to an improved thin film transistor active matrix LCD device and an improved method of forming the thin film transistor active matrix LCD device, the improvement coming from being able to prevent conductors in the array from becoming cut by internal stresses in the conductors caused by step coverage.

2. Description of Related Art

Generally, an active matrix for use in an LCD device includes a thin film transistor (TFT) connected to each pixel via a pixel electrode. The TFT is connected to a gating circuit through a metal gate line and to a metal signal (or data) line for transmitting a signal from a driving circuit to a pixel electrode made of indium tin oxide (ITO).

Figure 1:
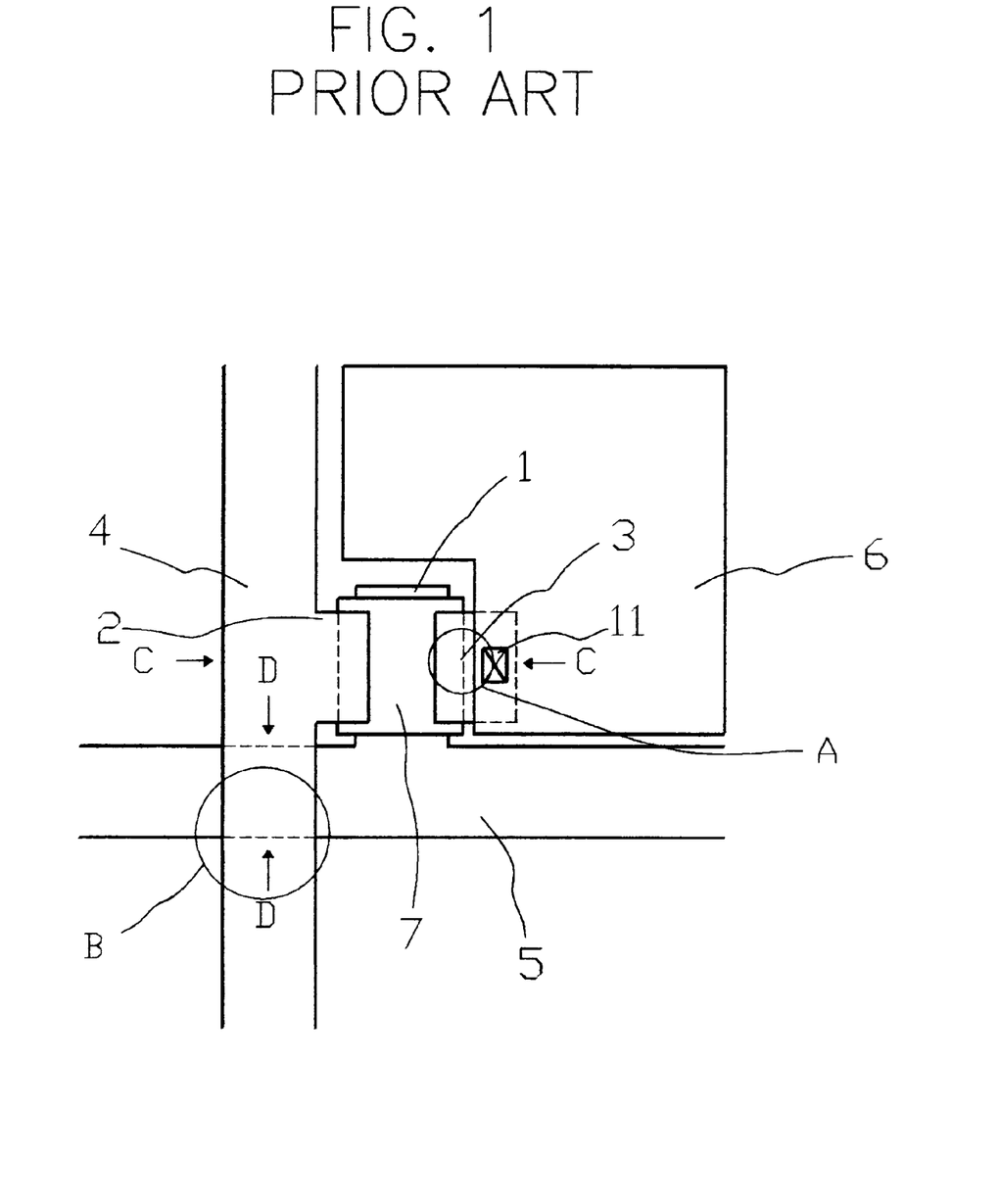
FIG. 1 is a partial top plan view of a conventional array substrate device of a liquid crystal display device.

As shown in FIG. 1, an active matrix of a liquid crystal display device includes a gate electrode 1 of a thin film transistor, which is connected to a gate line 5, a drain electrode 2 connected to a signal (or data) line 4, and a source electrode 3 connected to a pixel electrode 6. In such an active matrix, if the gate line is enabled(i.e., an increased voltage is applied on the gate line 5), then the TFT turns on and a picture signal, if any, inputted by the signal line 4 is transmitted to the pixel electrode 6. By selectively applying signals to all the pixels in an LCD, a desired picture appears on the liquid crystal display.

Figure 2:
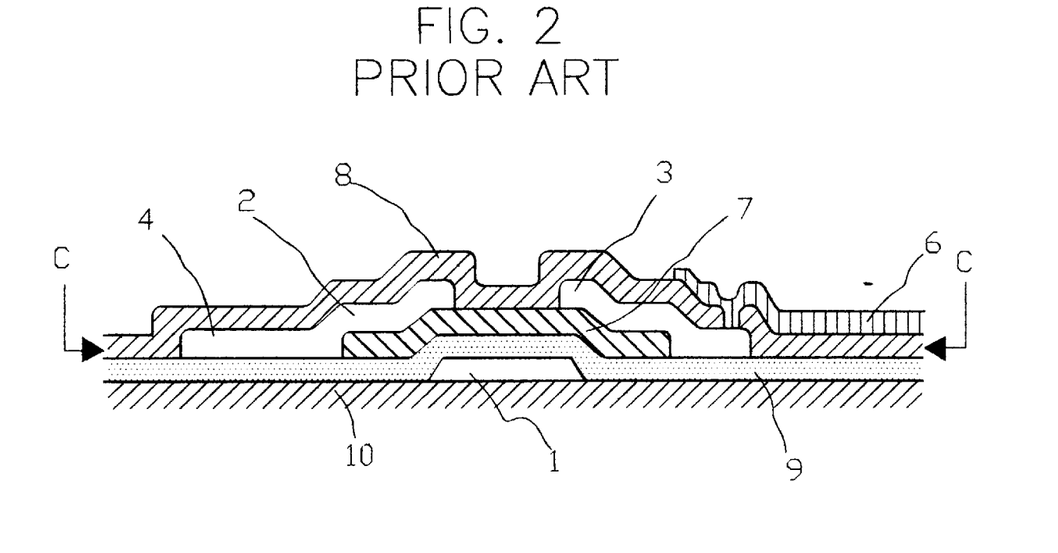
FIG. 2 is a cross-sectional view of FIG. 1, taken along line C—C.
Figure 3:
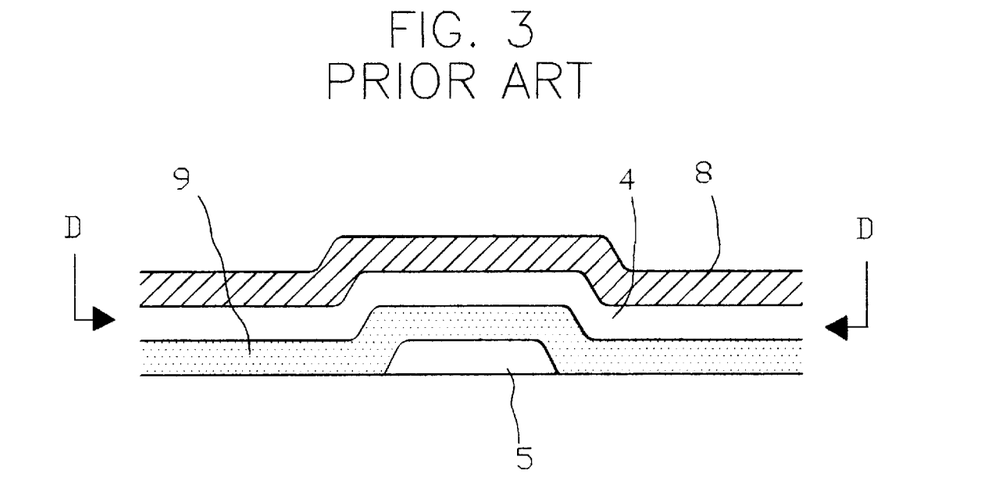
FIG. 3 is a cross-sectional views of FIG. 1, taken along line D—D.

FIGS. 2 and 3 illustrate cross-sections of FIG. 1. The LCD uses the ITO on passivation (IOP) technique to form the pixel 6. The transparent ITO pixel 6 is prepared by the following method. First of all, after a metal such as Cr, Ta, Al, etc., is deposited on a substrate 10 by a sputtering method, it is patterned by a photoreading method and gate electrode 1 and gate line 5 are formed on the substrate. Thereafter, an insulating layer 9 such as SiNx, SiO$_2$, etc., is deposited on the substrate 10 having the gate electrode 1 and the gate line 5 formed thereon. Then, a semiconductor layer 7 is deposited thereon by the plasma CVD (chemical vapor deposition) method, and subsequently patterned.

Subsequently, a metal composed of Al or Al alloy is deposited by sputtering and then is patterned to form the signal (or data) line 4, the drain electrode 2 and the source electrode 3. Then a protective layer 8 is deposited thereon. After a contacting hole 11 is formed in the protective layer 8 (located at the end of the source electrode 3) by patterning, the pixel electrode 6 is formed on a pixel region of the substrate 10 and also is formed in the contacting hole region so that the pixel electrode 6 connects to the source electrode 3.

However, such a conventional active matrix for a liquid crystal display device as shown in FIGS. 1, 2 and 3, suffers from a number of problems. For example, the signal(or data) line or the source and drain lines frequently are cut because the overlying lines, being made of metal, are susceptible to the weaknesses of conforming to a stepped shape. That is, the signal or data line 4 can become cut due to having to conform, i.e., cross the stepped shape of the gate line 5 at the portion B where the gate line 5 crosses under the signal line 4. Alternatively, the source and drain electrodes 2 and 3 can become cut at the portion A (FIG. 1) of TFT due to the weaknesses imposed by the step coverage.

SUMMARY OF THE INVENTION

Accordingly, it is an object of the present invention to provide an improved conductor array for an LCD, and method of formation thereof, which eliminates the above problems encountered with the conventional conductor array of a liquid crystal display device.

Another object of the present invention is to provide an improved electrical-conducting structure in an LCD, and method of formation thereof, that prevents the effects of conductors being cut due to internal stresses in the conductors caused by having to undergo step coverage. This advantage increases the yield of the overall LCD manufacturing process.

The objects of the present invention are fulfilled by providing, in a thin film device having a first layer and a second layer covering a portion of the first layer such that an edge is formed where the second layer starts, a redundant electricity-conducting structure comprising: a first conductor partially covering an area over the first layer and partially covering an area over the second layer such that the first conductor must undergo a large change in surface direction where the conductor follows the edge contour of the second layer; and a redundant second conductor partially covering the first conductor at least in an area extending outside of an area under which is located the large change in surface direction.

The objects of the present invention also are fulfilled by providing, for a thin film device having a first layer and a second layer covering a portion of the first layer such that an edge is formed where the second layer starts, a method of forming a redundant electricity-conducting structure, the method comprising the steps of: forming a first conductor to partially cover an area over the first layer and to partially cover an area over the second layer such that the first conductor must undergo a large change in surface direction where the first conductor follows the edge contour of the second layer; and forming a redundant second conductor to partially cover the first conductor at least in an area extending outside of an area under which is located the large change in surface direction.

Other objects and further scope of applicability of the present invention will become apparent from the detailed description give hereinafter. It should be understood, however, that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 4:
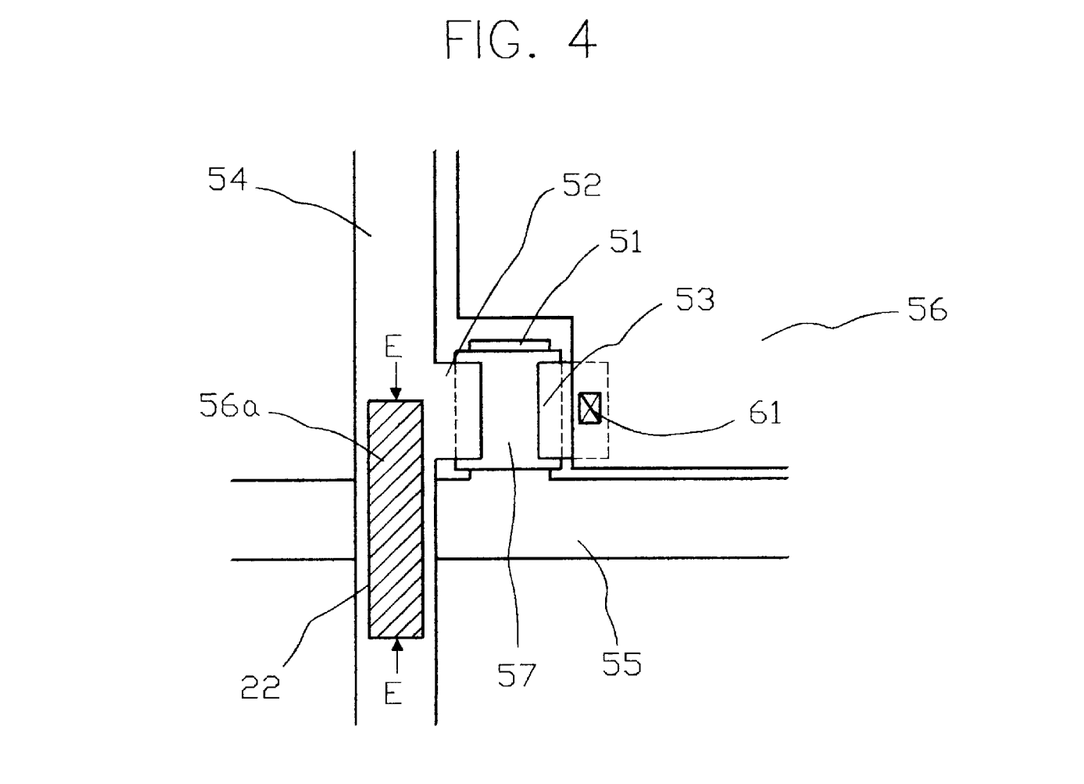
FIG. 4 is a partial top plan view of an array substrate device of a liquid crystal display according to the present invention.
Figure 5:
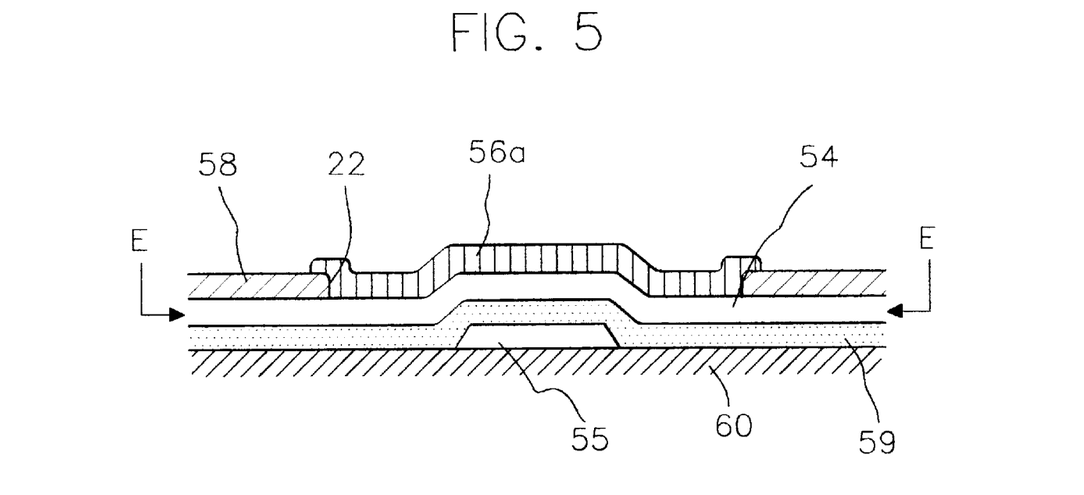
FIG. 5 is a cross-sectional view of FIG. 4, taken along line E—E.

Referring now in detail to the drawings for the purpose of illustrating preferred embodiments of the present invention, a first embodiment of the present invention is shown in FIGS. 4–5, and is a liquid crystal display device. The first embodiment includes a gate line 55 for gating, i.e., selectively turning off and on, a thin film transistor (TFT), a gate electrode 51 connected to the gate line 55, a drain electrode 52 connected to a signal (or data) line 54 (which transmits a picture signal through the TFT to a pixel when the TFT turns on), and a source electrode 53 connected to a pixel electrode 56 of a pixel region through a first type of contacting hole, namely hole 61.

A second type of contacting hole, namely hole 22, is formed on a portion of the data line 54 where the data line 54 crosses over the gate line 55. The hole 22 is rectangular, with the longer of its two dimensions lying along the same direction as the data line 54, which is parallel to the direction of the insulating layer 59 (positioned between the substrate 60 and the data line 54). The boundaries, i.e., walls, of the hole 22 are formed out of the protective layer 58. The length of the hole 22 is longer than the width of the gate line 55. A material 56a is deposited to fill the second contacting hole 22. The material 56a is indium tin oxide (ITO), the same as that used for the pixel electrode 56.

The method according to the embodiments of the present invention comprises the steps of depositing a metal such as Cr, Ta, Al, on the substrate 60 by sputtering, forming the gate electrode 51 and the gate line 55 by patterning using photolithography, forming the insulator layer 59 by depositing SiN or Sio$_2$ on the substrate 60 and the gate line 55, forming a semiconductor layer 57 by depositing and patterning amorphous silicon or polysilicon using a plasma chemical vapor deposition (CVD), forming the data line 54, and the drain and source electrodes 52 and 53 (by patterning using photoetching), forming the protective layer 58 on the data line 54, and depositing the transparent pixel electrode 56 after previously forming the first and second contacting holes 61 and 22 by patterning the protective layer 58.

The first and second contacting holes 61 and 22 are formed on a region of the source electrode 53 and on a region of the data line 54, respectively. The material to be deposited on the first and second contacting holes 61 and 22, and the pixel region, is indium tin oxide (ITO). Indium Tin Oxide has excellent adhesive force compared with metal and is much more resistant to the internal stresses induced by having to undergo step coverage, thereby not being as susceptible to cutting.

In this device according to the present invention, the source electrode 53 contacts to the pixel electrode 56 through the first contacting hole 61 formed in the protective layer 58 covering the source electrode 53. The second contacting hole 22, formed in the protective layer 58 on the data line 54, is filled with ITO (at the same time that the pixel region 56 is deposited with ITO).

The ITO 56a deposited in the contacting hole 22 (and partially onto the protective layer 58) is a redundant conductor formed in anticipation of the significant possibility of the data line 54 being cut due to stresses induced by the data line 54 having to conform to the step shape of the intersecting gate line 55, i.e., due to "step coverage". Therefore, the ITO can connect (electrically) both severed portions of the cut signal line 54, if severing occurs. The ITO has a number of advantages for this use, such as, for example, excellent adhesiveness and resistance to stress-induced cutting (to which metal is susceptible). In other words, in the event of a cut, the ITO plug 56a acts as a splice or jumper that restores an electrical connection between the then-severed portions of the data line 54.

Figure 6:
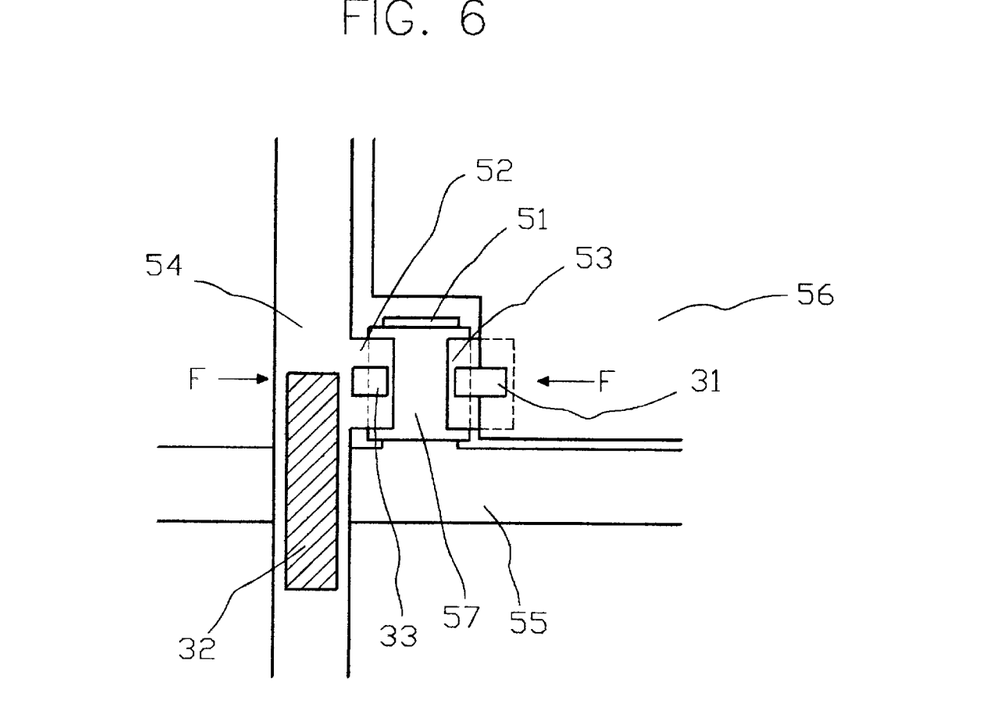
FIG. 6 is a partial top plan view of a second embodiment of the array substrate device of a liquid crystal display device according to the present invention.
Figure 7:
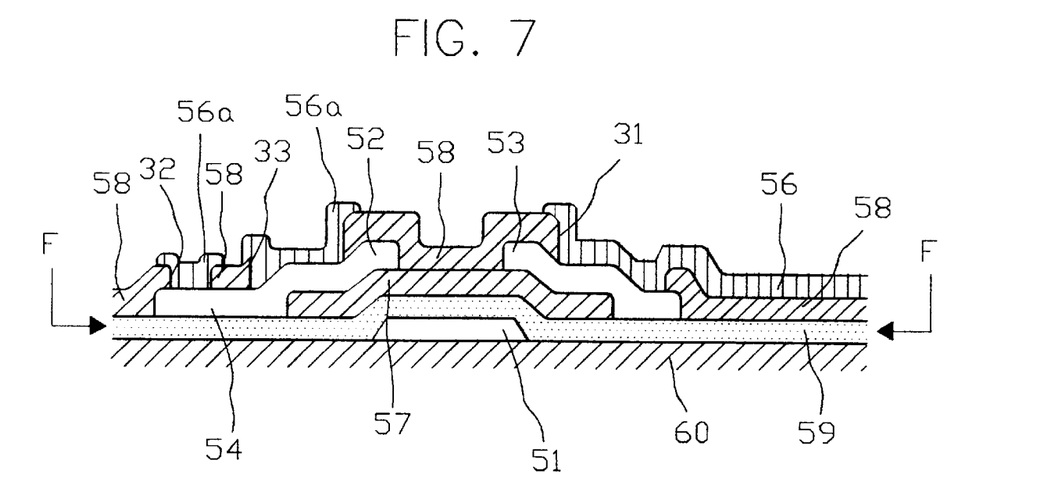
FIG. 7 is a cross-sectional view of FIG. 6, taken along line F—F.

Referring in detail to FIGS. 6 and 7, there is illustrated a second embodiment of the invention. The second embodiment device of the present invention includes three types of ITO-plugged contacting holes 31, 32 and 33 disposed on the protective layer 58 on the substrate 60.

The second type of contacting hole is hole 32, which is formed on the crossover (or step coverage) region of the data line 54 and the gate line 55, as with contacting hole 22 of the first embodiment of the present invention.

The first type of contacting hole is hole 31, which is formed on the source electrode 53, and additionally extends over the crossover region between the source electrode 53 and the gate electrode 51. The additional extension of the hole 31 is different from the contacting hole 61 of the first embodiment of the present invention. The first contacting hole 31, when filled with ITO, functions to connect electrically the source electrode 53 to the pixel electrode 56, as in the first embodiment. Yet the ITO layer 56, formed in the first contacting hole 31, also is a redundant conductor that functions as a jumper if, and when, the source electrode 53 is cut due to the step coverage stresses in the source electrode 53 caused by conforming to the semiconductor layer 57.

The third type of contacting hole is hole 33, which is formed in the protective layer 58 on the drain electrode 52. When filled with the ITO 56a, the third contacting hole 33 is a redundant structure that functions as a jumper if, and when, the drain electrode 52 is cut due to the step coverage stresses in the drain electrode 52 caused by conforming to the semiconductor layer 57.

Accordingly, in the second embodiment of the present invention, ITO serving as a redundant conductor (or jumper) is deposited on the signal line 54 as well as on the drain and source electrodes 52 and 53 over the step coverage areas corresponding to the semiconductor layer 57, so that the embodiment can operate normally if one or more of the data line 54, and the drain and source electrodes 52 and 53, are cut.

Figure 8:
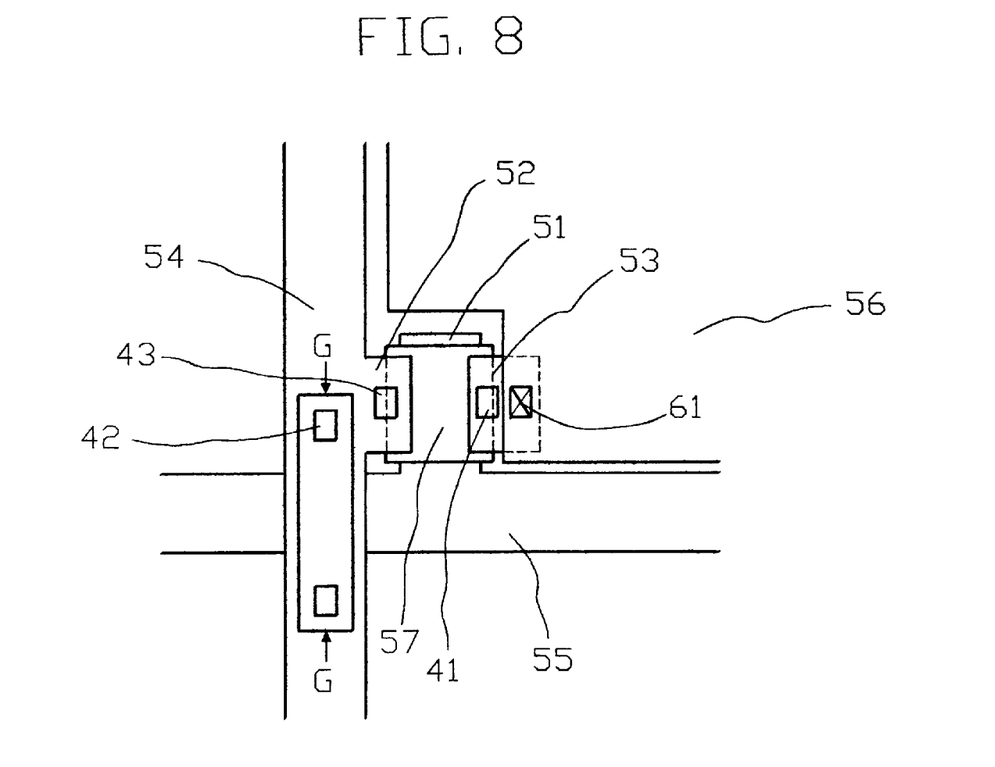
FIG. 8 is a partial top plan view of a third embodiment of the array substrate device of a liquid crystal display device according to the present invention.
Figure 9:
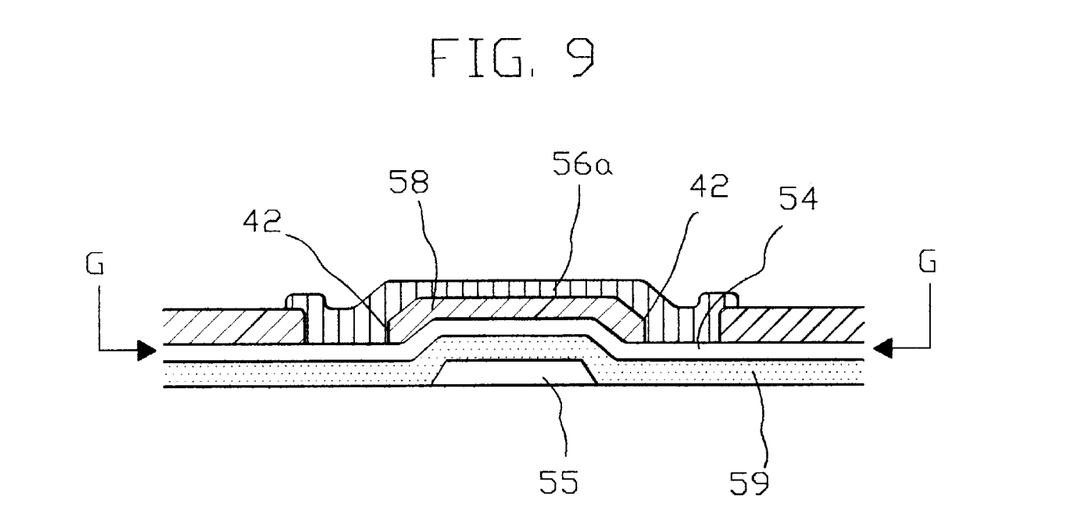
FIG. 9 is a cross-sectional view of FIG. 8, taken alone line G—G.

Referring to FIGS. 8 and 9, there is illustrated a third embodiment of the present invention. The third embodiment includes three types of ITO-plugged contacting holes 41, 42 and 43, formed on the source electrode 53, the data line 54 and the drain electrode 52, respectively.

The second type of contacting holes 42 are different from the contacting holes 22 and 32 of the first and second embodiments of the present invention. The holes 42 are formed on both sides, and outside, of the step-coverage region where the data line 54 crosses over the gate line 55. That is, the pair of contacting holes 42 do not overlap the step-coverage region as in the first and second embodiments of the present invention.

In the first and second embodiments, if the data line 54 is cut prior to the holes 22 and 32, respectively being formed, etchant (used to form the holes 22 and 32) can penetrate through the cut, and erode, a portion of the gate insulator layer 59. In that circumstance, the data line 54 and the gate line 55 become connected, i.e., shorted together, when the hole 22 or 32 is filled with ITO.

The third embodiment, in contrast, positions the holes 42 outside of the step-coverage region, such that etchant seeping through a pre-existing cut in the data line 54 cannot reach the gate line 55. The ITO 56*a* fills and connects the holes 42 as it covers the segment of the protective layer 58 remaining over the step-coverage region. Therefore, the ITO deposited on the pair of contacting holes 42 is effectively connected only to both sides of the severed data line 54 if the data line 54 becomes cut.

Two contacting holes, that is, the first type of contacting hole 61 and one of the third type of contacting holes 41, are formed on the source electrode 53. In other words, the contacting hole 61, formed on the source electrode 53 of the pixel region, is the same as in the first embodiment, i.e., it connects the source electrode 53 to the pixel electrode 56.

The contacting hole 41 is formed over the outermost portion, or boundary, of the semiconductor layer 57. The contacting hole 41 is filled with ITO 56*a* as with the other contacting holes and prevents the source electrode 53 from being cut due to the internal stresses in the electrode 53 caused by step-coverage region associated with the outermost portion of the semiconductor layer 57.

Also, the other (third-type) contacting hole 43, is formed on the drain electrode 52 boundary of the semiconductor layer 57. The contacting hole 43 is filled with ITO 56*a* and prevents the electrode 52 from being cut due to the internal stresses in the electrode caused by the step-coverage associated with the outermost portion of the layer 57.

According in the third embodiment, ITO 56*a* is used as redundant conductors for, and on, the crossover region of the data line 54 and the gate line 55, the boundaries of the semiconductor layer 57, and the drain and source electrodes 52 and 53. The ITO 56*a* acts as a jumper connecting the severed sides together when the overlying conductor is cut due to stresses in the overlying conductor caused by the "step coverage". The redundant conductor ITO structure preserves normal operation and increases the yield of non-defective devices.

Other modifications of the present embodiments according to the present invention are as follows. The contacting hole can be formed on the entire length of the signal line 54, or each contacting hole can be formed on the signal line 54 and the drain electrode 52 as one composite structure. Also, the insulator layer 59 and the semiconductor layer 57 can be piled between the line 54 and the gate line 55.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a thin film device having a first layer and a second layer covering a portion of the first layer such that an edge is formed where the second layer starts, a redundant electricity-conducting structure comprising:

a first conductor partially covering an area over the first layer and partially covering an area over the second layer such that the first conductor must undergo a large change in surface direction where the conductor follows the edge contour of the second layer; and a redundant second conductor connected to and partially covering the first conductor at least in an area extending outside of an area under which is located the large change in surface direction;

wherein the first layer is a substrate;

wherein the second layer is a first signal line;

wherein the first conductor is a second signal line oriented perpendicularly to the first signal line;

wherein the structure includes an insulating layer between the second signal line and the first signal line;

wherein the redundant second conductor is in contact with areas on the second signal line outside of an intersection region of the second signal line with the first signal line; and wherein the redundant second conductor is separated from the second signal line in the intersection region by a protective layer.

2. A structure as in claim 1, wherein:

the protective layer is formed on the first conductor; and the protective layer has two holes therein which are filled by the redundant second conductor.

3. A structure as in claim 2, wherein:

the redundant second conductor extends outside the holes and onto the protective layer.

4. A structure as in claim 1, wherein:

the redundant second conductor is formed from a different substance than a substance from which the first conductor is formed.

5. A structure as in claim 4, wherein:

the substance of the redundant second conductor is more resistant to internal stresses, caused by having to conform to a large change in direction, than is the substance of the first conductor.

6. A structure as in claim 5, wherein:

the first conductor is metal; and wherein the redundant second conductor is indium-tin oxide.

7. A structure as in claim 5, wherein:

the thin film device is a liquid crystal display;

wherein the second layer is a gate line;

wherein the first conductor is a data line.

8. For a thin film device having a first layer and a second layer covering a portion of the first layer such that an edge is formed where the second layer starts, a method of forming a redundant electricity-conducting structure, the method comprising the steps of:

forming a first conductor to partially cover an area over the first layer and to partially cover an area over the second layer such that the first conductor must undergo a large change in surface direction where the first conductor follows the edge contour of the second layer; and forming a redundant second conductor to connect to and to partially cover the first conductor at least in an area extending outside of an area under which is located the large change in surface direction;

wherein the first layer is a substrate;

wherein the second layer is a first signal line;

wherein the first conductor is a second signal line oriented perpendicularly to the first signal line;

wherein the method further includes forming an insulating layer between the second signal line and the first signal line;

wherein the step of forming the redundant second conductor includes:

forming a protective layer to separate the second signal line and the redundant second conductor of an intersection region of the second signal line with the first signal line; and forming the redundant second conductor to contact areas on the second signal line outside of the intersection region.

9. A method as in claim 8, further comprising:

forming the protective layer on the first conductor; and forming two holes in the protective layer;

wherein the step of forming the second conductor includes filling the holes.

10. A method as in claim 9, wherein:

the step of forming the redundant second conductor includes extending the redundant second conductor outside the holes and onto the protective layer.

11. A method as in claim 8, wherein the step of forming the redundant second conductor includes:

forming the redundant second conductor from a different substance than a substance from which the first conductor is formed.

12. A method as in claim 11, wherein the step of forming the redundant second conductor includes:

forming the redundant second conductor from a substance that is more resistance to internal stresses, caused by having to conform to a large change in direction, than is the substance of the first conductor.

13. A method as in claim 12, wherein the step of forming the first conductor includes:

forming the first conductor from metal; and wherein the step of forming the redundant second conductor includes:

forming the redundant second conductor from indium-tin oxide.

14. A method as in claim 12, wherein:

the thin film device is a liquid crystal display;

wherein the second layer is a gate line;

wherein the first conductor is a data line.

15. In a liquid crystal display device, a redundant electricity-conducting structure comprising:

a semiconductor layer on a first layer, the semiconductor layer connecting a source electrode to a drain electrode to form a thin firm transistor (TFT), there being a large change in surface direction at a step region where the semiconductor layer ends underneath said source electrode;

said source electrode formed on said first layer and said semiconductor layer such that said source electrode extends across said step region;

a protective layer on the source electrode, the protective layer having a contact hole therein that extends across said step region; and a pixel electrode connected to said source electrode through said contact hole in said protective layer such that a contact area between said source electrode and said pixel electrode extends across said step region, said pixel electrode additionally functioning as a redundant electricity-conducting structure in said step region.

16. A structure as in claim 15, wherein:

the pixel electrode extends outside the hole and, in cross section, onto both sides of the protective layer.

17. A structure as in claim 15, wherein:

the pixel electrode is formed from a different substance than a substance from which the source electrode is formed.

18. A structure as in claim 17, wherein:

the substance of the pixel electrode is more resistant to internal stresses, caused by having to conform to said large change in surface direction at said step region, than is the substance of the first conductor.

19. A structure as in claim 18, wherein:

the source electrode is metal; and wherein the pixel electrode is indium-tin oxide.

20. In a liquid crystal display device, a method of forming a redundant electricity-conducting structure, the method comprising the steps of:

forming a semiconductor layer on a first layer that will connect a source electrode to a drain electrode and so form a thin film transistor (TFT), there becoming a large change in surface direction at a step region where the semiconductor layer will end underneath said source electrode;

forming said source electrode on said first layer and said semiconductor layer such that said source electrode extends across said step region;

forming a protective layer on the source electrode;

forming a contact hole in said protective layer that extends across said step regions; and forming a pixel electrode to connect with said source electrode through said contact hole in said protective layer such that a contact area between said source electrode and said pixel electrode extends across said step region, said pixel electrode additionally functioning as a redundant electricity-conducting structure in said step region.

21. A method as in claim 20, wherein:

wherein the step of forming the pixel electrode also extends the pixel electrode outside the hole and, in cross section, onto both sides of the protective layer.

22. A method as in claim 20, wherein the step of forming the pixel electrode includes:

forming the pixel electrode from a different substance than a substance from which the source is formed.

23. A method as in claim 20, wherein the step of forming the pixel electrode includes:

forming the pixel electrode from a substance that is more resistant to internal stresses, caused by having to conform to said large change in surface direction at said step region, than is the substance of the source electrode.

24. A method as in claim 23, wherein the step of forming the source electrode includes:

forming the source electrode from metal; and wherein the step of forming the pixel electrode includes:

forming the pixel electrode from indium-tin oxide.

25. In a liquid crystal display device, a redundant electricity-conducting structure comprising:

a thin film transistor having a semiconductor layer formed on a first layer, and a source and drain electrode disposed on said semiconductor layer and said first layer, respectively, there being a large change in surface direction at each of a first and second step region where said semiconductor layer ends underneath said source and drain electrodes, respectively;

said source electrode formed on said first layer and said semiconductor layer;

said drain electrode formed on said first layer and said semiconductor layer; and a conductive layer on said source and drain electrodes, said conductive layer being patterned into a pixel electrode and a drain backup, said pixel electrode extending across said first step region as a first redundant electricity-conducting structure for said source electrode, and said drain backup extending across said second step region as a second redundant electricity-conducting structure for said drain electrode.

26. A structure as in claim 25, further comprising:

a protective layer on the source electrode;

wherein the protective layer has a hole therein which is filled by the pixel electrode.

27. A structure as in claim 26, wherein:

the pixel electrode extends outside the hole and onto the protective layer.

28. A structure as in claim 25, wherein:

the pixel electrode is formed from a different substance than a substance from which the source electrode is formed.

29. A structure as in claim 28, wherein:

the substance of the pixel electrode is more resistant to internal stresses, caused by having to conform to said large change in surface direction at said step region, than is the substance of the first conductor.

30. A structure as in claim 29, wherein:

the source electrode is metal; and wherein the pixel electrode is indium-tin oxide.

31. A method of forming a redundant electricity-conducting structure in a liquid crystal display device, the method comprising:

providing a first layer;

forming a semiconductor layer on said first layer;

forming a source electrode and a drain electrode on said first layer and said semiconductor layer, respectively, there being a large change in surface direction at each of a first and second step region where said semiconductor layer ends underneath said source and drain electrodes, respectively;

forming a pixel electrode and a drain backup on said on said source electrode and drain electrode, respectively, said pixel electrode extending across said first step region as a first redundant electricity-conducting structure for said source electrode, and said drain backup extending across said second step region as a second redundant electricity-conducting structure for said drain electrode.

* * * * *